June 8, 1965
E. P. MOREHOUSE
3,187,959
MANUAL GREASE GUN STRUCTURE
Filed Sept. 4, 1963
2 Sheets-Sheet 1
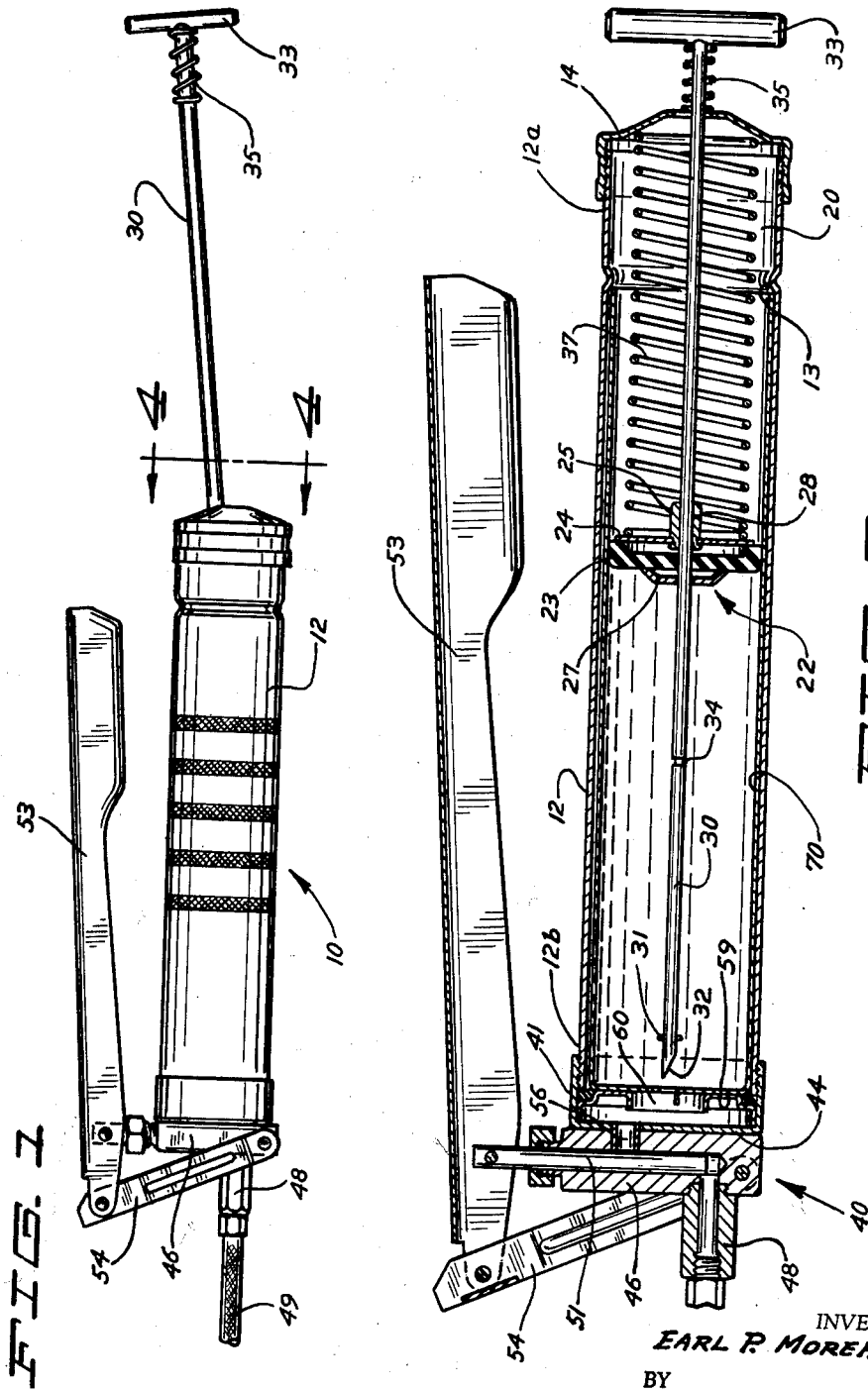
INVENTOR.
EARL P. MOREHOUSE
BY
Reifand Gregory
ATTORNEYS June 8, 1965
E. P. MOREHOUSE
3,187,959
MANUAL GREASE GUN STRUCTURE
Filed Sept. 4, 1963
2 Sheets-Sheet 2
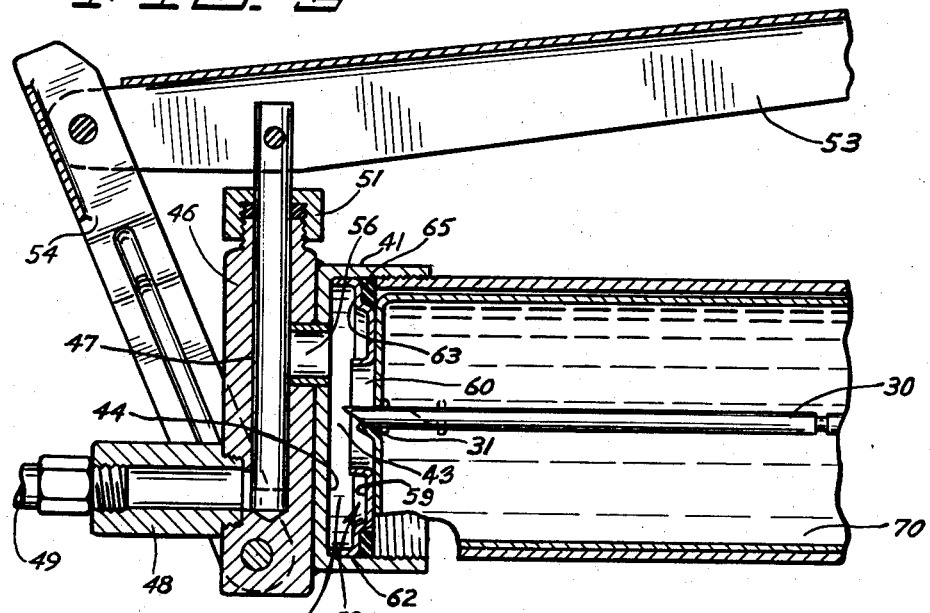
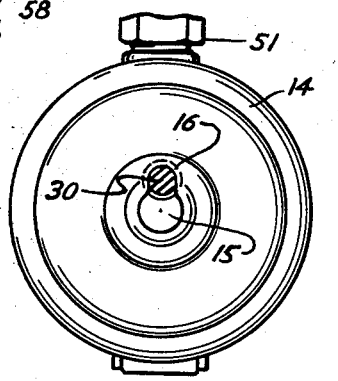
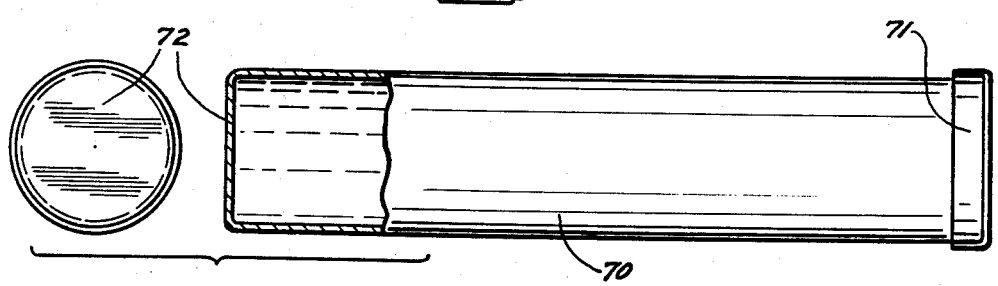
INVENTOR.
EARL P. MOREHOUSE
BY
Reiland Gregory
ATTORNEYS United States Patent Office 3,187,959
Patented June 8, 1965

3,187,959
MANUAL GREASE GUN STRUCTURE
Earl P. Morehouse, Bristol, S. Dak., assignor to K-P Manufacturing Co., Minneapolis, Minn., a corporation of Minnesota
Filed Sept. 4, 1963, Ser. No. 306,493
2 Claims. (Cl. 222—256)

This invention relates to an improvement in a hand operated grease gun and more particularly to an improvement in the operating relationship of said gun in connection with a grease cartridge contained therein. The invention disclosed herein represents substantial improvement over the invention disclosed and claimed by the applicant in his application for U.S. Letters Patent, Serial No. 255,027, filed January 30, 1963.

In a conventional type of a cartridge fed hand operated grease gun, both ends of the cartridge must be removed upon loading the cartridge into the gun. When the discharge end of the cartridge is removed prior to loading the cartridge into the gun, there results a leakage or spillage of grease which soils the hands and clothing of the operator.

It is desirable therefore to provide a grease gun whereby the grease cartridge may be loaded and sealed therein with the discharge end of said cartridge left whole to be ruptured by operation of the grease gun.

A conventional type of grease gun has a discharge passage eccentric to the axis of the barrel or main housing of the gun. It is desirable to provide a construction for a cartridge rupturing grease gun which requires only a simple and relatively inexpensive modification of a conventional type of grease gun.

It is an object of this invention therefore to provide a grease gun arranged and constructed to receive a grease cartridge having a sealed or unbroken discharge end and having means to rupture said discharge end after said cartridge has been loaded into said gun and said gun is ready for operation.

It is another object of this invention to provide a grease gun having means to rupture the discharge end of a grease cartridge loaded therein with means to automatically withdraw said rupturing means from said ruptured end of said cartridge to provide an unobstructed discharge outlet in said cartridge.

It is a further object of this invention to provide means adapting a conventional design of grease gun to rupture the discharge end of a grease cartridge as a part of the operation of said gun.

These and other objects and advantages of the invention will be fully set forth in the following description made in connection with the accompanying drawings in which like reference characters refer to similar parts throughout the several views and in which:

FIG. 1 is a view of a hand operated grease gun in side elevation;

FIG. 2 is a view of a grease gun in longitudinal vertical section on an enlarged scale showing the applicant's invention therein;

FIG. 3 is a broken view in vertical section showing details of construction of applicant's invention with a portion thereof broken away and a portion shown in dotted line;

FIG. 4 is a view in end elevation and partially in vertical section taken on line 4—4 of FIG. 1 as indicated; and FIG. 5 is a composite view in end elevation and partially in vertical longitudinal section showing a grease cartridge of a type for use with applicant's device.

With reference to the drawings, a conventional type of hand operated grease gun is shown indicated generally by the character 10. Applicant's invention has to do with improvement in certain details of construction of said grease gun as will hereinafter be described. Said grease gun 10 is shown comprising an elongated cylindrical housing 12 having a removable cap 14 threaded onto the end portion 12a of said housing defining an outer end wall, said end cap having an axial or central aperture 15 therein having a radial slot 16 extending outwardly thereof of smaller width than the width of said aperture. Said housing is shown having an annular rib 13 formed inwardly thereof spaced somewhat from said end portion 12a to act as a stop member for the grease cartridge to be loaded into said gun, as will hereinafter be described. Formed within said housing is a chamber 20.

Disposed within said chamber 20 is a piston of a common design indicated generally by the character 22 comprising a cup-shaped yielding ring 23 having a metal backing plate member 24 with an integral hub portion 25 projecting therefrom and an inverted cup-shaped facing plate 27. Running through said piston is an axial bore 28 having a rod 30 disposed therethrough. Said rod has struck therefrom a pair of projecting ears 31 adjacent its inner end serving as a retainer for said face plate 27. Said rod extends through the aperture 15 of said end cap 14 and terminates in an operating handle 33. Carried on said rod between said end cap and said operating handle is a coil compression spring 35 which is designed to hold said rod in a certain extended position outwardly of said housing, as will hereinafter be further described.

Carried on said rod within said chamber 20 is a coil compression spring 37 of conventional design extending between said piston 22 and the inner side of said end cap 14. Said spring will be of a length to be constantly under compression within said chamber and serves to bear against said piston sufficiently to hold together the several portions described as comprising said piston in operating position. Said piston will be pressed by said spring either against said projecting ears 31 if the gun is empty or against the supply of grease present in a grease cartridge within said gun with the gun loaded, as will hereinafter be further described. Said spring will have sufficient strength to discharge grease from within said gun by means of said piston.

The inner end 32 of said rod 30 is designed to rupture the discharge end of a grease cartridge. While said end of said rod may be variously formed for this purpose, it is here shown in the form of a beveled end.

Formed in said rod 30 spaced somewhat from said projecting ears 31 is an annular groove 34 adapted to be seated in said radial slot 16.

Threaded onto the discharge end 12b of said housing by an internally threaded collar 41 is a discharge end cap 40. Said end cap comprises a chamber discharge 43 within said collar, said chamber being open into said chamber 20 of said housing 12 and having an inner end wall 44. Integral with said wall as by welding is a housing 46 though only shown in elevation preferably will be substantially rectangular in form having a longitudinally extending valve body 47 having a nipple 48 extending outwardly of one end thereof to which is connected a hose 49 for attachment to a conventional grease gun fitting as in connection with motor vehicles.

Disposed within said valve body 47 and extending outwardly thereof is a valve stem 51 which will be operated in a conventional manner by a lever 53 forming an operating handle mounted onto a link 54 as illustrated.

Said discharge chamber 43 communicates with the valve body 47 by means of a passage 56. This passage represents conventional construction in being eccentric to the axis of the housing 12.

The applicant at this point provides a very simple and economical improvement in converting the conventional construction of a grease gun into one whereby the discharge end of a grease cartridge may be ruptured after being loaded into the gun.

The collar 41 is formed to have a somewhat greater width than is conventional. Disposed within said collar and more specifically within the chamber therein to fit nicely therein is an annulus indicated generally by the character 58 having a flat facing portion 59 having a central aperture 60 having a short depending flange. Said annulus has a depending peripheral flange 62 which will seat on the inner wall 44 of said chamber. Formed about said facing portion 59 is a peripheral channel 63 and adapted to have seated therein to form a seal with the inner surface of said collar 41 is an annular gasket 65. The chamber 66 between said annulus 58 and the wall 44 provides for a passage for grease from said aperture 60 to said passage 56. It is noted that the chamber 66 is formed of a part of the larger chamber 43 first described.

Disposed within said chamber 20, as illustrated in FIGS. 2 and 3, is a grease cartridge 70 of the type indicated generally in FIG. 5 and this represents a conventional design of a grease cartridge. Said cartridge has a removable cap 71 at its inlet end and its sealed discharge end is indicated by the character 72.

Operation

As above described, the discharge end of a conventional design of a grease gun has been modified to provide means for rupturing a grease cartridge for the discharge of grease therefrom in the operation of the gun.

The annulus removably seated within the collar 41 of said end cap 40 provides a central aperture 60 concentric with the axis of the housing 12 and centrally aligned with the rod 30. Said annulus is spaced sufficiently from the wall 44 of said end cap to provide passage from said aperture 60 to said passage 56 which communicate directly with the valve body 47 for discharge by the valve stem 51 operated by the handle 53.

In the operation of the grease gun, the end cap 40 is first removed. The operating handle will be pulled to draw the rod 30 outwardly of the housing 12 retracting the piston 22 and compressing the spring 37 to the point of having the annular slot 34 of said rod 30 engaged in the radial slot 16. The rod is cocked to one side for engagement in said radial slot. Thus the chamber 20 is unobstructed to freely receive a grease cartridge.

The cap 71 at the inlet end of the grease cartridge is removed and the cartridge is inserted into the housing 12. The rib 13 forms a stop for the grease cartridge and the piston 22 will be received within the inlet end of said cartridge. The discharge end 72 of the cartridge is left whole and untouched. The end cap 40 is next threaded onto said housing 12.

The rod 30 is next released from the radial slot 16 and is moved inwardly of the housing 12 into and through the grease cartridge. The grease in the cartridge will hold back the piston 22 and will hold the spring 37 under its maximum compression.

The rod 30 in its normal position as illustrated in FIG. 2 is short of engaging the discharge end of the grease cartridge. With the housing held firmly in the left hand, the handle 33 will be pushed sharply in a snap action to engage and rupture the discharge end 72 of the grease cartridge with the beveled tip portion 32 of the rod 30. The rod 30 is of such a length that when pushed inwardly by the handle 33 against the compression of the spring 35, said tip will travel just far enough to fully penetrate the end portion 72 and rupture the same. When the handle 33 is released, the spring 35 expands sufficiently to withdraw the tip portion 32 from the aperture 74 which it formed by penetrating or rupturing said end portion 72. Thus said aperture is free from any obstruction and the spring loaded piston 22 will discharge grease therethrough. The handle 53 will be operated to discharge the grease through the hose 49.

Thus it is seen that I have provided a simple and efficient hand operated grease gun which very conveniently ruptures a grease cartridge for discharge of grease therefrom as a step in its operation.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claims.

What is claimed is:
1. A grease gun assembly, comprising:
    (a) a grease gun having an elongated housing with an outer end wall and a substantially flat inner end wall;
    (b) said inner end wall having a discharge passage therethrough;
    (c) valve means connected with said discharge passage;
    (d) a grease cartridge disposed within said elongated housing between said housing end walls and having a discharge end adjacent said inner end wall;
    (e) an elongated reciprocably movable rod of greater length than said housing which extends through said grease cartridge;
    (f) a spring-biased movable piston which is adapted to move axially along the interior of said grease cartridge and which has a central opening through which said elongated rod passes;
    (g) the outer end of said elongated reciprocable rod having a handle, and the inner end thereof having rupture means to pierce said discharge end of said grease cartridge; and
    (h) spacer means in said housing between said discharge end of the grease cartridge and said housing inner end wall for defining a discharge chamber therebetween, and the axial length of said spacer being great enough to permit said rupture means of said elongated rod to pierce said discharge end of the grease cartridge without interference from said inner end wall.
2. The grease gun assembly as set forth in claim 1, wherein said spacer comprises:
    (a) a rigid annuular member overlying said discharge passage; and
    (b) an annular depending flange adjacent the outer periphery thereof and integral therewith for providing necessary axial length for said spacer, and clearance for said discharge passage.

References Cited by the Examiner

UNITED STATES PATENTS

| | | | |
|---|---|---|---|
| 1,621,109 | 3/27 | Drummond | 222—82 |
| 2,858,962 | 11/58 | Lucien | 222—82 |
| 3,059,819 | 10/62 | Sundholm | 222—256 X |

FOREIGN PATENTS 240,874 3/26 Great Britain.

LOUIS J. DEMBO, *Primary Examiner.*